UNITED STATES PATENT OFFICE.

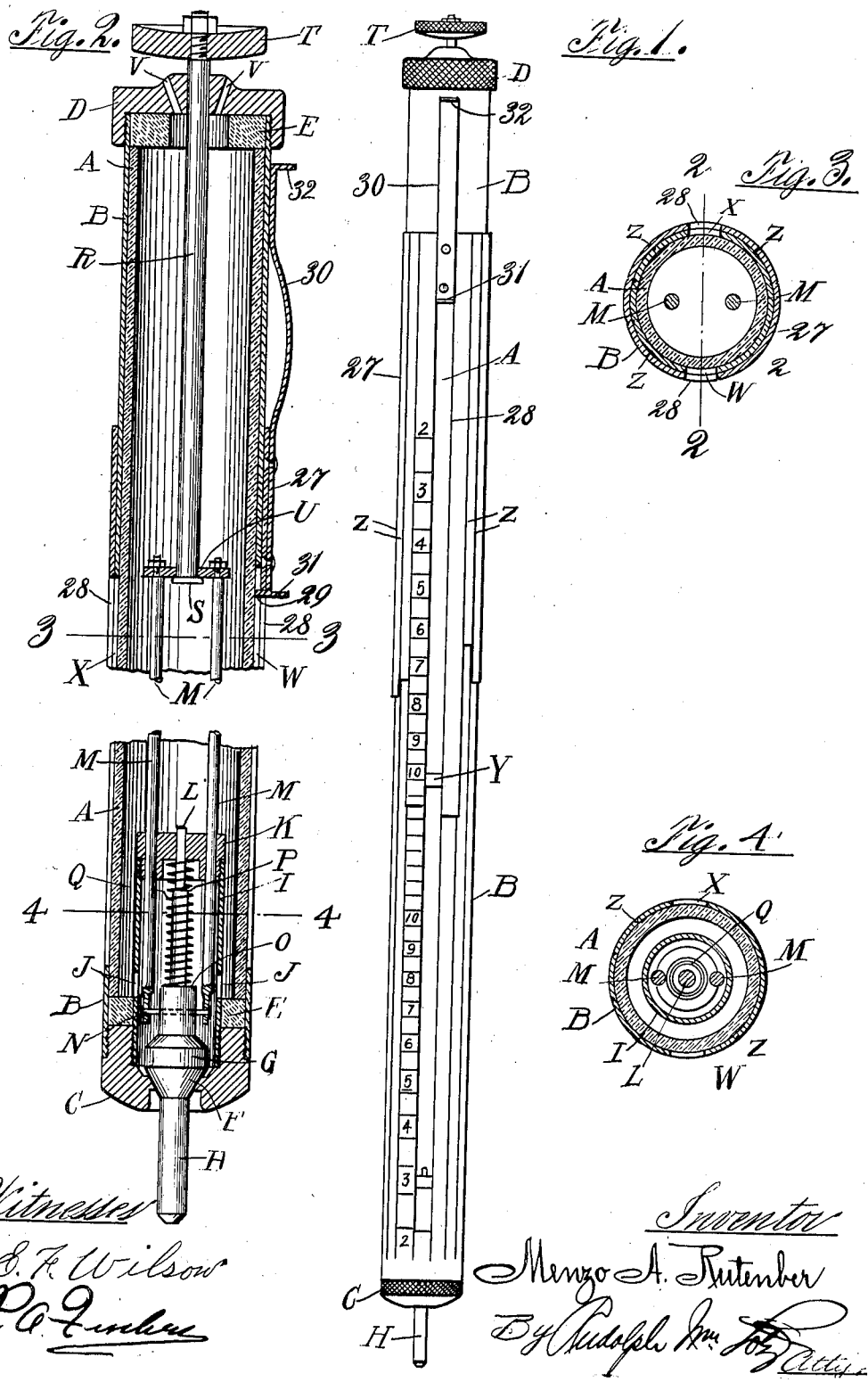

MENZO A. RUTENBER, OF CHICAGO, ILLINOIS.

WANTAGE-GAGE.

No. 896,761.  Specification of Letters Patent.  Patented Aug. 25, 1908.

Application filed June 17, 1907. Serial No. 379,499.

*To all whom it may concern:*

Be it known that I, MENZO A. RUTENBER, citizen of the United States, residing at Chicago, in the county of Cook and State of Illinois, have invented certain new and useful Improvements in Wantage-Gages; and I do hereby declare the following to be a full, clear, and exact description of the invention, such as will enable others skilled in the art to which it appertains to make and use the same.

My invention relates to a novel construction in a device for accurately determining the volume of liquid contents of barrels or casks or the ullage or wantage thereof, the object being to provide a device of this character which is particularly adapted for use by gagers employed by the Government, and by distillers, rectifiers and liquor dealers generally to enable them to readily and accurately ascertain the quantity of liquid contained in, or the ullage of the barrel, and consists in the features of construction and combinations of parts hereinafter fully described and claimed.

In the accompanying drawings illustrating my invention: Figure 1 is a view in elevation of a device constructed in accordance with my invention. Fig. 2 is a fragmentary central longitudinal section of the same on the line 2—2 of Fig. 3, the connecting rods shown being represented as turned through an arc of ninety degrees from the position shown in Fig. 3. Figs. 3 and 4 are transverse sections on the lines 3—3 and 4—4 respectively of Fig. 2.

As before stated my device is designed particularly to meet the requirements of the liquor trade and internal revenue department of the Government as related to and controlling said liquor trade, and in the following I shall describe the invention and the method of employing the same in its relation to this particular adaptation thereof, though it will be understood that its use is not confined thereto.

The Government, in order to determine the taxes due it on spirituous liquors manufactured and sold in this country, prescribes that all such taxable liquors or spirits shall be packed and stored in barrels of various standard sizes ranging substantially from a ten gallon to a fifty gallon keg or barrel, these standard sizes being prescribed so that a single instrument called a "wantage" or "ullage" rod, and bearing on its various faces sets of graduations adapted to enable the ullage of each of said standard size packages to be read, will answer for gaging all of said packages.

The wantage rods now most generally employed consist of a rectangular stick of wood on each face of which are longitudinally disposed sets of graduations beginning at a given point adjacent the upper end of said rod and reading downwardly, one of said faces carrying an ordinary foot rule graduation reading upwardly from the lower end. By inserting said rod in a barrel and sinking the same therein through the bung hole until the line at which the first-named sets of graduations begin is flush with the inner wall of the barrel at said bunghole, a wet line will appear on said rod and will indicate by reading on the proper set of graduations the quantity of liquid wanting to fill said barrel, the contents remaining being then readily calculated. Briefly, the wantage or "outs" are thus measured provided the barrel is not less than half full, but if less than half filled, the operation is reversed to measure the "ins." This is accomplished by sinking said rod until its lower end rests upon the bottom of the barrel and then extracting the same and reading the wet line in inches and fractions thereof. The depth in inches indicated is then deducted from the total length of the foot rule scale from said first-named line downwardly and then, after determining the proper point on this scale, reading around to the proper set of graduations which will thus indicate the quantity contained in the barrel in the same manner as the outs are indicated therein. That is to say, if the barrel contains liquid to the depth of six inches, the quantity contained therein must necessarily equal the similar vacant space in the top of the barrel resulting from the withdrawal of a corresponding volume of liquid. Hence, the same graduations which indicate such wantage, would, by the inversion of the reading from the bottom of the cask, also indicate the "ins" or contents remaining in the bottom of said barrel. The readings on the said rod are relatively difficult for various reasons the most important of which are 1st. That the wet line rapidly disappears by reason of the highly evaporative character of the liquid and by reason of the transparency of such liquid is not easily discernible.

2nd. That the warehouses employed are relatively very dark and illumination thereof with artificial light is obviously dangerous.

3rd. That the liquid very rapidly discolors the rod so that the figures thereon quickly become very hard to read. The last-named disadvantage is, of course, readily overcome by purchasing new rods as fast as old ones become badly discolored.

My present invention has for its particular objects to provide a device which is not discolored or otherwise affected by the liquid; by means of which a sample of the liquid is extracted, and which said sample indicates clearly and during any desired interval of time on the graduated scales contained on the instrument either the "ins" or the "outs" and which said reading or indication is so clearly and positively defined as to be easily readable in relatively dark places, as will hereinafter more fully appear. To these and other ends my said device comprises a transparent glass tube A open at both ends and which is inclosed in a tubular metal jacket B on both ends of which heads C and D are mounted, between which and the ends of said tube A, washers E are compressed, the latter consisting preferably of cork treated with beeswax to render it impermeable to liquid. The head C of said jacket B is provided with a centrally disposed valve-seat F on which the valve G seats, the latter having a tongue H projecting below the lower end of the head C. Mounted in the latter concentric therewith and with said valve-seat is a tube I of smaller diameter than the tube A, which is provided with openings J. Mounted in the free end of said tube I is a head K having a central opening through which the upper end of the stem L of the valve G passes, and having openings disposed on diametrically opposite sides of said central opening through which rods M pass, the latter being connected at their lower ends with a cross-pin N passing through said valve-stem L adjacent its lower end. Said valve-stem L is reduced between its ends and further reduced at its upper end to provide two annular shoulders O and P thereon, the former of which serves as a seat for the lower end of the compression spring Q confined between the same and said head K to hold said valve G normally closed, and said shoulder P serving to limit the opening movement of said valve. The inner diameter of the said tube I is greater than the largest diameter of said valve G so that when the latter is raised liquid may pass through the annular space between said valve and the inner wall of said tube I and through the openings J in the latter into said tube A. The head D of said jacket B is provided with a central opening through which a vertically movable plunger R passes, the latter being provided at its lower end with an annular flange S and at its upper end carrying a suitable knob or button T which is readily grasped by the hand to open said valve G against the action of the spring Q. Revolubly mounted on said plunger R is a plate U which is held thereon by means of said annular flange S and which is provided at diametrically opposite sides of its central opening with openings in which the upper ends of said rods M are secured, said plunger R being thus connected with said valve G so that the latter may be opened thereby. It will be noted, however, that said plate U is free to move vertically on said plunger R so that pressure on the latter applied simultaneously with pressure on the tongue H will not prevent opening of the valve G. The said head D is further provided with a plurality of openings V disposed around said central opening therein through which air displaced by liquid rising in said tube A readily escapes. The said jacket B is longitudinally slotted on diametrically opposite sides, the slots W and X therein being spanned at intervals by straps Y integral with the said jacket to prevent spreading of the walls thereof. As shown in Fig. 3 the said rods M are so disposed that neither of the same is in alinement with to obscure the view through said slots W, so that the level of liquid in said tube A can be readily seen through the said slots.

My said device is greater in length than the diameter of the largest barrel to be gaged, and the lower end portion of the jacket B thereof is provided exteriorly with longitudinally disposed graduated scales, the total number of the latter being equal to the total number of different sizes of standard barrels prescribed or used, and which vary in length accordingly; that scale designed for the largest size barrel being, of course, the longest and extending over less than one-half the total length of the device, beginning with the extreme lower end of said tongue H which form the starting point of each of said graduated scales. The latter are contained in longitudinal fields defined by longitudinal groove Z in the wall of the jacket B, said fields being preferably of equal width. Mounted on said jacket B and longitudinally movable thereon is a sleeve 27 provided on diametrically opposite sides with slots 28 corresponding in width and registering with the slots W and X, said sleeve being held against revolution relatively to the said jacket B by means of a projection 29 on said sleeve 27 entering and fitting one of said slots in said jacket. Secured to said sleeve 27 at its upper end portion is a flat spring 30 the lower end of which carries said projection 29 and also an outwardly projecting flange 31, the free end portion of said spring 30 being bent between its ends and the extreme free end portion bearing normally upon the jacket B to maintain said sleeve frictionally against longitudinal movement on said jacket. A flange 32 on the upper end of said spring 30 enables said sleeve 27 to be readily moved by the operator. The outer face of said sleeve is divided into fields corresponding in number and location with the fields on the jacket B and each containing graduated scales having its starting point in a horizontal plane flush with the upper face of said flange 31, and reading downwardly. In the upper portion of each of said fields above the starting point of the graduated scale therein is marked the standard capacity of the barrel which the graduated scale contained in said field is adapted to.

The standard size barrels will vary somewhat in capacity, it being relatively impossible to make the same so exact as to prevent any variations. For this reason a barrel supposed to have a capacity of ten gallons is designated on the instrument as "9–11" and a fifty gallon barrel as a "45½–49", representing the minimum and maximum capacities of such barrels.

My said device is used as follows in gaging: If the barrel be less than half full, then the contents thereof must be measured by determining the level of the liquid therein on the graduated scales on the jacket B. To accomplish this, the instrument is inserted into the bunghole until the tongue H of the valve G strikes the bottom. Pressure on the body of the instrument will cause the said valve to open whereupon liquid will enter the glass tube A and rise therein to the level of the liquid in the barrel. By then releasing the body of the instrument the said valve will close and confine the liquid so that by removing the instrument and holding the same between the eyes and a source of light, the level of the liquid is easily seen through the slots W and X. By placing the index finger on the jacket B at the level of the liquid and turning the instrument relatively to said index finger until the latter rests on the graduated scale corresponding to the capacity of the barrel from which the liquid was drawn, the reading on each scale will show within a given percentage the number of gallons contained in the barrel. Absolute accuracy is not attainable by reason of variations in convexity of the barrels and variations in depth of charring internally.

If the level of the liquid is higher than the topmost figure on the graduated scale, then the reading must be taken on the "wantage" scales. To effect this, the sleeve 27 is moved downwardly on the jacket B so that the lower end of the graduated scale on said sleeve marked with the capacity of the barrel to be gaged slightly overlaps the corresponding scale on the jacket B. The instrument is then reinserted in the barrel and held so that the flange 31 bears against the inner wall of the barrel at the bunghole. The knob or button T is then drawn upwardly, whereupon the liquid will adjust its level in said tube A to correspond with the level in the barrel. The knob is then released to close the valve, when, upon removing the instrument the wantage can obviously be read on the graduated scale on said sleeve 27. The liquid contained in the tube A is then returned to the barrel by partly reinserting the instrument and opening the valve by drawing the knob T upwardly to open the valve.

My device is also applicable as a means for readily withdrawing samples from the barrel, as will be obvious, and will serve as a means for adjusting the color of liquor contained in various barrels to correspond exactly.

I claim as my invention:

1. A device of the kind specified, comprising in combination a transparent tubular receptacle, a jacket inclosing same and provided with diametrically oppositely disposed longitudinal slots, a valve controlled opening in the lower end of said jacket through which liquid is admitted and exhausted, operating means connected with said valve, and a longitudinally movable sleeve on said jacket provided with longitudinal slots adapted to register with said slots in said jacket, said jacket and sleeve being provided with oppositely reading graduated scales on which the liquid level in said receptacle will indicate the volume of contents or wantage of barrels of various capacities.

2. A device of the kind specified, comprising in combination, a transparent tubular receptacle, a jacket inclosing the same, said jacket being provided at opposite ends with a valve controlled inlet for liquid and air discharge openings through which liquid and air are admitted and discharged from said tubular receptacle, means connected with the valve controlling said first-named opening, a sleeve longitudinally movable on said jacket, said jacket and sleeve having registering diametrically oppositely disposed longitudinal slots, and graduated scales on said jacket and sleeve on which the liquid level in said receptacle indicates the volume of contents of barrels in which said device is inserted.

3. A device of the kind specified, comprising in combination, a transparent tubular receptacle, a jacket inclosing the same, said jacket being provided at opposite ends with a valve controlled inlet for liquid and air discharge openings through which liquid and air are respectively admitted to and discharged from said tubular receptacle, operating means connected with the valve controlling said first-named opening, a sleeve longitudinally movable on said jacket, said jacket and sleeve having registering diametrically oppositely disposed longitudinal slots, graduated scales on said jacket having a common starting point at the lowermost end of said device, a projection on said sleeve, and graduated scales on said sleeve, having a common starting point in the plane of the highest point in said projection, the level of liquid contained in said receptacle indicating on said graduated scales the volume of liquid contents of the barrel.

4. A device of the kind specified, comprising a glass tube, a metal casing inclosing the same and provided with two diametrically oppositely disposed longitudinal slots, heads disposed at the ends of said casing and provided with central openings, a spring-actuated valve controlling the opening in one of said heads, a longitudinally reciprocal plunger disposed in the other head, and connecting rods connecting said valve with said plunger disposed within said glass tube out of alinement with the slots in said casing.

In testimony whereof I have signed my name in presence of two subscribing witnesses.

MENZO A. RUTENBER.

Witnesses:
   RUDOLPH WM. LOTZ,
   IRVING COWLES.